May 31, 1960 P. L. WILLMORE 2,939,079
METHOD OF CALIBRATING AN ELECTROMAGNETIC SEISMOGRAPH
Filed Oct. 21, 1957
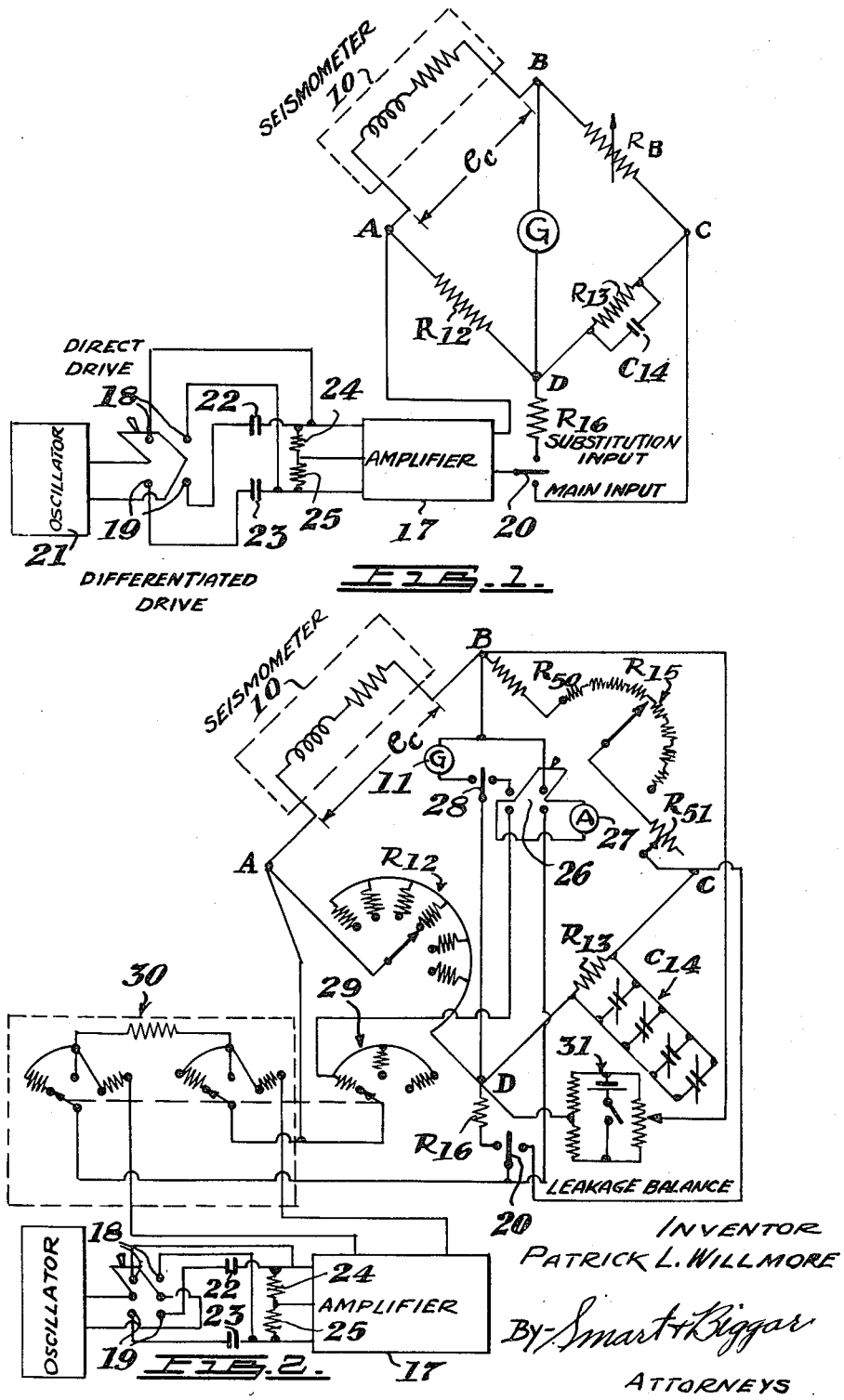
INVENTOR
PATRICK L. WILLMORE
By Smart & Biggar
ATTORNEYS United States Patent Office 2,939,079
Patented May 31, 1960

2,939,079

METHOD OF CALIBRATING AN ELECTRO-MAGNETIC SEISMOGRAPH

Patrick L. Willmore, Billings Bridge, Ontario, Canada, assignor to Her Majesty The Queen In Right of Canada as represented by the Minister of Mines and Technical Surveys Filed Oct. 21, 1957, Ser. No. 691,243

6 Claims. (Cl. 324—158)

The present invention relates to an electrical method of calibrating an electromagnetic seismograph.

The problem of calibrating a seismograph is to determine its response to a sinusoidal ground movement of any given amplitude and frequency. In the case of electromagnetic instruments, which consist of a seismometer having a resiliently mounted mass and an electromagnetic transducer, together with a galvanometer, the usual procedure in calibration is to determine the electrical and mechanical properties of the seismometer and associated galvanometer separately, and to deduce mathematically the response of the coupled system. This method has the disadvantage that the calculations required are quite complex, especially when the reaction of the galvanometer on the seismometer is significant.

Each different type of electromagnetic seismometer requires a different procedure to determine mathematically its response characteristics. In order to be able to determine the electrical and mechanical properties of the seismometer and galvanometer it is necessary to dismantle the seismograph and make observations on the individual components. This dismantling of the equipment is a severe disadvantage since considerable time is required and certain critical adjustments of the equipment will be destroyed. This method of determining the electrical and mechanical properties involves possible errors since any minor impurities in the materials of the transducer may alter the accuracy with which the calculations may be made.

Another known method of calibrating a seismograph involves the use of a vibrating table on which the seismometer is mounted. Vibrating tables are normally of two types and are adapted to calibrate either horizontal seismographs or vertical seismographs. In the case of vertical seismographs, the vibrating table is operated to simulate ground movement and the seismograph is calibrated from the responses obtained. This method has serious disadvantages in that the vibrating table must be very large in mass (e.g. 250 times the mass of the seismometer) compared to the mass of the seismometer and since electromagnetic seismometers may weight several hundred pounds, the construction of a table large enough and capable of being driven smoothly over the whole range of frequencies involved in seismology is of great technical difficulty and is accomplished only at a very high cost.

Horizontally vibrating tables for calibration of horizontal seismographs are even more difficult to design and construct than vertical ones since any tilts which appear when the instrument is operating will introduce errors due to components of gravity which are superimposed on the desired horizontal accelerations. This effect is most noticeable when calibration at the lowest frequencies is desired. If errors from tilt of the horizontal table are to be kept below 10% of the total response of the instrument for oscillations with a period of 60 seconds, the tilt of the table must be less than one one-millionth of a radian per centimeter of horizontal displacement.

The present invention provides an improved method and apparatus for calibrating a seismograph having a galvanometer and an electromagnetic seismometer which includes a frame and mass resiliently mounted to the frame, an electromagnetic transducer responsive to relative motion between the mass and frame.

The method according to the invention for finding the relative sensitivities of the seismograph at different frequencies comprises the steps of connecting the transducer as one arm of a Maxwell bridge circuit, connecting the galvanometer as a detector for the bridge circuit, clamping the mass of the seismometer to prevent relative motion, applying alternating current to the bridge circuit, and balancing the bridge circuit by obtaining a null reading on the galvanometer. The mass of the seismometer is then unclamped and the frequency of the alternating current applied to the bridge circuit is varied. The galvanometer deflections corresponding to various frequencies of the alternating current are noted.

The calibration of the seismograph may be made absolute by following the additional steps of applying the alternating current to the bridge circuit across one of the ratio arms thereof, clamping the mass of the seismometer to prevent relative motion of the mass and frame, and noting the deflection of the galvanometer. Then the mass of the seismometer is unclamped and the galvanometer deflection is again noted.

The present invention overcomes the disadvantages of previous methods of calibration by dispensing with complex mathematical determinations of operating constants of the instruments or large and cumbersome calibration devices. Apparatus according to the present invention is simpler in construction and, in operation, avoids laborious calculations while providing results which are at least equal in accuracy with those obtained using the vibrating table method.

According to the invention the seismograph is calibrated by electrical measurements only, the calibration being of response of the seimograph versus frequency of the applied voltage, with a constant voltage input. An important advantage of the present invention is that all measurements may be made on the seismograph without moving any of the component parts from their normal operating position. The present invention may be used for all types of electromagnetic seismographs and requires only slight differences in procedure for the measurements from one instrument to another. The seismograph can be calibrated in terms of absolute units or relative units using the apparatus and method of the present invention.

The seismometer under consideration is connected into one arm of a modified Maxwell bridge. The associated galvanometer is connected across the bridge as the detector. The Maxwell bridge enables the calibration of the seismograph to be carried out without removing the instruments from their normal operating positions and the calibration requires only the setting of dials and certain minor operations carried out on the seismometer itself.

In the drawings, which illustrate embodiments of the invention;

Figure 1 is a schematic diagram of an embodiment of the present invention,

Figure 2 is a schematic diagram of another embodiment of the invention.

The calibration of the seismograph is performed by means of a bridge circuit shown in Figure 1. This bridge is a variant of the well known Maxwell bridge wherein the seismometer is substituted for the unknown impedance and the galvanometer is substituted for the detector. An additional modification has been made to the bridge in order to enable the drive to the bridge to be either applied in the normal manner or across one leg thereof.

The components of the bridge circuit are a seismometer 10 connected between points A and B, a galvanometer 11 connected between points B and D, a fixed resistor R12 connected between points A and D, a variable resistor $R_B$ connected between points B and C, a fixed resistor R13 connected between points D and C and a fixed capacitor connected between points D and C. The input power to the bridge circuit is supplied by an amplifier 17 and oscillator 21 through a switch 20 which connects the input power either between the points A and D or the points A and C. Input terminals 18 and 19 provide for two different types of input as will be discussed further on.

The method according to the present invention is readily explained with reference to the mathematical equivalents of the elements in the apparatus. The method requires the treatment of the seismograph and the electrical measuring system as a coherent whole. In order that this is conveniently performed, the use of electro-mechanical analogy is made. The equations of motion of the mechanical parts of the system may be set up in the same form as the electrical circuit relations so that electrical circuit theorems may be extended to cover the combined system. The electrical and mechanical quantities which are taken as equivalents are listed in Table I:

| Electrical Element | Symbol Used | Mechanical Element | Symbol Used |
|---|---|---|---|
| E.M.F. | e analogous to | Force | p |
| Charge | q analogous to | Displacement | x |
| Inductance | L analogous to | Mass | M |
| Resistance | R analogous to | Damping Constant | D |
| Capacity | C analogous to | Spring Compliance (Spring stiffness= S) | $1/s$ |

To illustrate the analogies it is noted that the equation of motion of a mass on a spring, subject to viscous damping, is $$M\ddot{x} + D\dot{x} + Sx = p \quad (1)$$

and has the same form as the equation $$L\ddot{q} + R\dot{q} + q/c = e \quad (2)$$

which governs the current in the equivalent electrical circuit. Equivalent circuits for various seismographs have been given in the literature by Scherbatskoy, S. A., and Neufeld, J.: "The Equivalent Electrical Networks of Some Seismographs," Geophysics, vol. II, pp. 213–242, 1937; Silverman, Daniel: "The Frequency Response of Electromagnetically Damped Dynamic and Reluctance Type Seismographs," Geophysics, vol. IV, pp. 1–7, 1939; and Washburn, Harold W.: "Experimental Determination of Transient Characteristics of Seismograph Apparatus," Geophysics, vol. II, pp. 243–252, 1937.

By analogy with electrical impedance, we define the mechanical impedance as the ratio of the force acting at any point in a mechanical system to the velocity of motion which the force produces. For the system defined in Equation 1, the mechanical impedance ($Zm$) at frequency $\omega$ is $$Zm = jM\omega + D + S/\omega \quad (3)$$

where $$j = \sqrt{-1}$$

The expression $Zm$ will be used for the mechanical impedance of the mass of the seismometer in discussion of the absolute calibration of the seismograph further on.

The seismograph may be calibrated by means of the bridge circuit shown in Figure 1 and by following four steps:

*Step 1.*—The seismometer mass is rigidly clamped to the seismometer frame, power is applied to the bridge and the bridge is balanced by obtaining a null reading on the galvanometer.

*Step 2.*—The adjustments of the bridge are left as in Step 1 and the seismometer is unclamped. The frequency of the oscillator 21 is varied throughout the calibration range (periods of one hundred seconds to one one-thousandth of a second) and the galvanometer deflection is noted at the various frequencies.

*Step 3.*—The drive to the bridge circuit is switched by switch 20 to the substitution input connection as shown in Figure 1. The seismometer is then clamped and the galvanometer deflection is noted for one or more of the frequencies which were used in Step 2.

*Step 4.*—The method of Step 3 is repeated in this step of the method with the exception that the seismometer is unclamped.

In the following discussion of the operation of the circuit of Figure 1, the following symbols will be used:

M—seismometer mass,
x—seismometer displacement,
$\dot{x}$—seismometer velocity,
$\ddot{x}$—seismometer acceleration,
p—force exerted by a clamp on the seismometer mass,
$e_c$—the E.M.F. developed by the transducer of the seismometer,
$i_c$—current passed through the coil of the seismometer,
K—flux linkage of the seismograph transducer,
$e_s$—the E.M.F. across transducer in Steps 3 and 4,
$\theta$—galvanometer deflection,
$i_B$=current through $R_B$.

For the purpose of this discussion, a common symbol will be used for all quantities of the same type, i.e. one symbol for current, another for E.M.F., etc., with a suffix letter to describe the circuit element concerned and a suffix number for the step of calibration. In general statements, the numeral suffix will be omitted. Thus a general reference to the current in the seismometer coil would utilize the symbol $i_c$, and if this current were restricted to Step 2 of the calibration, the symbol would become $i_{c2}$. Capital letters are used for external E.M.F.'s and for the displacement of the ground.

Step 1 of the calibration of the seismograph is accomplished with the mass of the seismometer clamped to the seismometer frame which is in turn fixed to the ground. While the mass is clamped, neither the spring nor the damping system can exert any variable forces, so that Equation 1 which describes the motion of the seismometer mass reduces to $$M\ddot{x} = p \quad (4)$$

Unclamping the instrument in Step 2 is equivalent to introducing a force of $-p$ into the system. Therefore, when the mass is unclamped, it will move relative to the frame as though it were acted upon by a force of $-M\ddot{x}$. Conversely, if a force $p$ is applied to the mass of the seismometer, the seismometer would behave as though it were subject to an earth acceleration of $-p/M$.

The performance of the seismometer transducer may be described by the equation $$e_c = K\dot{x}_M \quad (5)$$

where $\dot{x}_M$ is the relative velocity of the two elements of the transducer, K is the flux linkage, and $e_c$ is the E.M.F. developed. When a current is passed through the coil, the force exerted by one element of the transducer on the other is $$p = Ki_c \quad (6)$$

The negative sign in Equation 5 expresses the fact that if the velocity $\dot{x}_M$ is in the same direction as the force $p$, then the E.M.F. opposes the flow of current through the transducer.

With the seismometer and galvanometer of the seismograph connected in the circuit of Figure 1, and the seismometer clamped any system of currents flowing through the bridge circuit will cause a current to flow through the seismometer arm of the bridge and this current will exert a force on the mass of the seismometer which is equal to $Ki_c$. At the same time, the galvanometer will be deflected. When the seismometer is unclamped, the mass becomes free to move. By the superposition theorem, the galvanometer deflection will change by an amount equal to the entire deflection which would have been produced by a force $Ki_c$ acting on the seismometer mass, or an equivalent ground acceleration $$\ddot{x} = \frac{-Ki_c}{M} \quad (7)$$

In order to overcome the tedious task of recording galvanometer deflections with the seismometer clamped, and then repeating these records with the seismometer unclamped, the present invention employs a Maxwell bridge. This bridge circuit enables the galvanometer deflections due to a current flowing through the seismometer when the seismometer is clamped in Step 1 of the method to be reduced to zero by balancing the bridge. When the seismometer is unclamped in Step 2, the galvanometer will start to swing, the deflection of the galvanometer from Equation 7 corresponding to an equivalent ground acceleration of $$-Ki_c/M$$

In order to absolutely calibrate the seismograph, it is necessary only to note the deflections of the galvanometer and to compute the equivalent ground accelerations $\ddot{x}$ in Equation 7 by determining the values of the unknown $K$ and $i_c$ in this equation, the mass $M$ of the seismometer being known. The current flowing through the seismometer coil in Step 1 of the method may be readily determined by measuring the input voltage supplied to the bridge circuit and dividing this quantity by the sum of the impedance of the seismometer and $R_B$. Steps 3 and 4 of the method of the present invention are incorporated in order to determine the value of the unknown $K$.

During all calibrations of the seismometer, ground accelerations are present in addition to deflections of the seismometer caused by E.M.F. supplied thereto. However, the actual ground accelerations are small compared to the E.M.F. induced accelerations of the seismometer and may be neglected without any loss in accuracy.

Referring to Figure 1, the balance conditions of the Maxwell bridge are $$R_c/R_{12} = R_B/R_{13} \quad (8)$$

and $$L_c/R_{12} = R_B \times C_{14} \quad (9)$$

These conditions hold true regardless of the frequency or wave form of the power input to the bridge circuit, provided only that the impedance of the seismometer when clamped may be represented as an inductance and a resistance, the values of which are independent of frequency.

In order that the accuracy of calibration obtained using the circuit of Figure 1 is sufficiently high, the resistor $R_{12}$ is much smaller than the seismometer coil resistance $R_c$ and $R_{13}$ is at least as large as $R_c$. It follows from Equation 8 that $R_B$ is much larger than $R_{13}$ and is therefore large in comparison with the seismometer coil resistance $R_c$. It may be noted that by reducing $R_{12}$ and increasing $R_B$ the condition is approached in which the seismometer is directly connected to the galvanometer. The preferred value of $R_{12}$ lies within the range of 1/5 to 1/15 of the value of $R_c$.

The correction required for the resistance of $R_{12}$ in series with the galvanometer and seismometer and the shunt effect of $R_B$ will never be very much greater than 20% of the total response of the system. Quite simple calculations may be used to estimate the required corrections or alternately, they may be eliminated by operating the seismometer always connected to the bridge circuit.

Steps 3 and 4 of the method of the present invention are included in order that the flux linkage of the seismometer transducer $K$ may be determined and the calibration of the seismometer made absolute.

The absolute calibration of the seismometer is accomplished by injecting a known E.M.F. across resistor $R_{12}$ in Step 3 of the method. By comparing $e_s$ with the E.M.F. developed by the seismometer in Step 1 of the calibration, $K$ may be determined and an absolute value may be assigned to the simulated ground acceleration $-Ki_c/M$.

First, the movement of the seismometer mass in Step 2 of the calibration is considered. By the defination of mechanical impedance the velocity $\dot{x}_{M2}$ is the ratio of the net force applied to the mechanical impedance of the moving element.

$$\dot{x}_{M2} = Ki_{c2}/Zm \quad (10)$$

where $i_{c2}$ is the current which actually flows in the seismometer coil, and $Zm$ is the mechanical impedance of the mass. Alternatively, the mechanical system will move when the mass is unclamped as though it were driven by the force which was applied before unclamping. When the seismometer mass moves under the action of an external force, currents are generated which tend to oppose this motion. These currents may be regarded as an additional mechanical impedance $Zg$. Equation 10 may therefore be written as shown in Equation 11 below.

$$\dot{x}_{M2} = \frac{Ki_{c1}}{(Zm + Zg)} \quad (11)$$

The term $Zg$ is inherent in Equation 10 also, but in that case, it is included in the term $i_{c2}$.

In Step 3 of the method of the present invention, the drive to the bridge supplied by the amplifier 17 is switched by means of switch 20 from the terminal marked main input to the terminal marked substitution input, without changing the frequency from that previously used in Step 2 of the method. The resulting current in resistor $R_{12}$ produces an effect which is equivalent to the introduction of an E.M.F. $e_3$ which deflects the galvanometer by an amount $\theta_3$. This E.M.F. replaces the E.M.F. $e_{c2}$ which was operating in the loop A, B, D of the bridge circuit during Step 2 of the method and which produced a galvanometer deflection $\theta_2$. Since the deflection of the galvanometer is a linear function of the applied E.M.F. the following relation is true.

$$e_{s3} = e_{c2}\frac{\theta_3}{\theta_2} \quad (12)$$

In formulating Equation 11 the fact has been neglected that the amplifier 17 was connected between terminals A and C during Step 2 of the method, and that during Step 3 it is connected between A and D. However, it may be shown that the fraction of the galvanometer current which is diverted by switching the amplifier 17 is of the order of $$\left(\frac{R_c}{R_B}\right)^2$$

Since $$\frac{R_c}{R_B}$$

is regarded as a small quantity, the square of this quantity may safely be neglected without impairing the accuracy of the results obtained.

By eliminating $e_{c2}$ and $\dot{x}_M$ between Equations 5, 11 and 12, the following relation is obtained:

$$e_{s3}\frac{\theta_2}{\theta_3} = \frac{K^2 i_{c1}}{(Zm + Zg)} \quad (13)$$

In Step 4 of the method, the settings of the circuitry are the same as in Step 3, with the exception that the seismometer is unclamped. The E.M.F. across $R_{12}$ is now $e_{s4}$ and the resulting galvanometer deflection is $\theta_4$. The current flowing in the seismometer coil is $$(i_{g4} + i_{B4})$$

where $i_{g4}$ and $i_{B4}$ are the currents in the galvanometer and $R_B$ respectively. This current flowing in the seismometer coil imparts a velocity $\dot{x}_{M4}$ to the seismometer mass which is shown in Equation 14 below.

$$\dot{x}_{M4} = \frac{K(i_{g4}+i_{B4})}{Zm} \quad (14)$$

The seismometer therefore generates a voltage $e_{c4}$, where $$e_{c4} = K^2 \frac{(i_{g4}+i_{B4})}{Zm} \quad (15)$$

The total E.M.F. which produces the deflection $\theta_4$ is $$(e_{c4}+e_{s4})$$

so that $$e_{c4}+e_{s4} = \theta_4/\theta_2 \quad (16)$$

Equations 15, 16, 10 and 5 yield the equation $$e_{s4}\theta_2/\theta_4 = K^2/Zm[i_{c2}+\theta_2/\theta_4(i_{g4}+i_{B4})] \quad (17)$$

In moving from Step 1 to Step 2 of the method, the effect of unclamping was to reduce the current in the seismometer coil from $i_{c1}$ to $i_{c2}$. This fact may be expressed by saying that $e_{c2}$ drives a current equal to $(i_{c1}-i_{c2})$ through the galvanometer and $R_B$ in parallel. Using the proportionality of current and galvanometer deflection, it may be seen that $$i_{c1}-i_{c2} = \theta_2/\theta_4(i_{g4}+i_{B4}) \quad (18)$$

so that Equation 17 reduces to $$e_{s4}\theta_2/\theta_4 = K^2 i_{o1}/Z_m \quad (19)$$

To determine the electrical quantities in Equations 13 and 19 the following relationships are noted $$e_s = \frac{E_s}{R_s} + \frac{R_r}{R_r} \quad (20)$$

and $$i_{c1} = E_{m1}/(Zc+R_B) \quad (21)$$

where $E_s$ and $E_m$ are the input voltages to the bridge in Steps 3 and 4 and Steps 1 and 2 respectively. $Zc$ is the impedance of the coil, whose resistive and inductive components are determined from the balance conditions (Equations 7 and 8) and the known values of the bridge elements. For frequencies used i.e., periods of 100 sec to .001 sec, it will usually be found that the inductive term in $Zc$ can be neglected in comparison with $(Rc+R_B)$.

Comparing Equations 19 and 13, it is found that the effect of unclamping the seismometer is to eliminate $Zg$ from the equation. The result is a valuable one, for the seismometer mass can usually be treated as a simple pendulum, whose mechanical impedance $Zm$ can be calculated from Equation 3.

Knowing $Zm$, K may be found from Equation 19 and then $Zg$ may be found from Equation 13, and the seismometer calibration is made absolute.

In most cases, the effect of unclamping is to reduce the galvanometer deflection for a given value of $e_s$. This is to be expected from the fact that the galvanometer reaction normally increases the effective mechanical impedance of the seismometer. Variable reluctance instruments may show a reverse effect which may be puzzling at first sight, but which follows naturally from the fact that the large inductance of these instruments causes the current to lag behind $e_c$, and hence to exert a force across the transducer which acts like a negative contribution to the seismometer mass. Shaking table results showing the same effect for high-frequency geophones have been given by Silverman.

In some seismometers, it is possible to apply a known force to the mass by lifting a test weight, and this provides an opportunity of using the bridge in a way which is directly related to an existing method of calibration. To do this, a square wave (or interrupted D.C.) is applied to the bridge, the galvanometer throw is observed when the current starts or stops. Since each application of current produces a force $Ki_c$, it is directly comparable to the effect of removing the test mass, and K is found by comparing the throws produced in each case.

A given input to the bridge simulates the effect of an acceleration of the ground. For sinusoidal movements, an acceleration $\ddot{x}$ corresponds to a velocity of $\dot{x}/\omega$ or a displacement of $\ddot{x}/\omega^2$, so that a calibration curve expressed in terms of one of these parameters can readily be converted to either of the others. The velocity calibration, however, has a very characteristic flat top for seismographs in which the periods of the seismometer and galvanometer are widely different and the damping is near critical. As this constitutes an important class of instruments, and since velocity data are closely related to earthquake energies, it is desirable to be able to determine the velocity calibration directly.

The acceleration of the ground is the derivative of velocity with respect to time. If, therefore, the input current is differentiated before it reaches the bridge, the bridge current will simulate acceleration as before, and the input before differentiation will simulate velocity. In the circuit of Figure 1, provision is made for passing the input through a pair of condensers 22 and 23 and resistors 24 and 25 in series, which differentiate the input, the voltage across the resistors is proportional to the differential of the primary input. This voltage is passed to the amplifier 1 7which drives the bridge. In principle, a second differentiation could be used to make the primary input simulate earth displacement. However, each stage of differentiation magnifies errors in the wave-form of the primary input, and it has been found that a single stage is about the practical limit.

Hinged seismometers differ from those described above in that the effect of a force is determined by its moment about the hinge, rather than by the magnitude of the force alone. Thus the force excited by a current $i_c$ is equivalent to a ground acceleration $\ddot{x}$, where $$\ddot{x} = K1_c i_c/M1_m$$

and $1_c$ and $1_m$ are the distances from the hinge line to the coil and to the centre of gravity of the boom respectively. In Steps 3 and 4, $K1_c$ appears in place of K throughout all the equations, the moment of inertia of the boom is substituted for M in calculating $Zm$, and angular rotations of the boom about the hinge are used in place of $X_m$. With these substitutions, the mathematical explanation given above may be applied.

Some seismometers, notably the Benioff variable reluctance instrument, are equipped with two coils for driving long-period and short-period galvanometers simultaneously. When calibrating such seismometers, both galvanometers should be left connected so that the reaction on the seismometer is kept at the proper value. Inductive coupling between the coils may then produce a significant transfer of energy from one coil to the other when the seismometer is clamped, so that the balance condition is no longer independent of frequency. With Benioff seismometers the effect becomes quite large at frequencies above 1 cycle/sec. It is therefore necessary to re-balance the bridge with the seismometer clamped at each frequency used in the calibration.

The dependence of the balance condition on frequency when two galvanometers are used means that the bridge can only be balanced for a pure sine wave. Thus if the value of K is to be found by comparing the effect of a square-wave drive with the removal of a test mass, the method is most easily performed with the second galvanometer disconnected. If both galvanometers are left in the circuit, it is necessary to record the throw produced by a given current step when the seismometer is clamped, and then to perform the method and second time to determine the change of throw produced by unclamping.

The embodiments illustrated in Figure 2 of the drawings is one which the inventor has found particularly useful in calibrating certain types of electromagnetic seismograph. In this embodiment the components which correspond to those of Figure 1 have been labelled with the same symbol. Certain additional components have been added to this circuit in order that additional accuracy and ease of operation may be maintained. As in Figure 1, the seismometer 10 is connected between points A and B on the bridge circuit, and the galvanometer 11 is connected between points B and D via switch 28. The resistance $R_B$, between points B and C is made up of a fixed resistance $R_{50}$, a stepped resistance $R_{15}$ and a fine adjustment $R_{51}$. Resistance $R_{13}$ and capacitance $C_{14}$ are connected between points C and D. Resistor $R_{12}$ is connected between points A and D and resistor $R_{16}$ is connected between points D and one contact of the switch 20. Between the amplifier 17 and the bridge circuit, a stepped attenuator 30 is connected and between points B and D of the bridge circuit A, an additional bridge circuit 31 which provides a leakage balance control is connected.

The variable resistors are ten-turn precision potentiometers and fixed resistors $R_{13}$, $R_{16}$, and $R_{50}$ are wire wound units rated at two watts or more. Since the resistors in this circuit have to carry currents which vary sinusoidally with the period of earthquake waves and will therefore be heated and cooled at twice this frequency, it is of extreme importance that the values of these resistors remain constant throughout the current cycle. For this reason, composition resistors and potentiometers are unsuitable since their values change with temperature. The meter 27 is a centre zero microammeter. In one position of the switch 26, the meter is used to determine the approximate balance conditions of the bridge circuit before the galvanometer is connected. In the other position of switch 26, the meter indicates the input voltage to the bridge from the amplifier 17. Associated with the stepped attenuator 30 is a switch ganged thereto which selects a series resistor to convert the meter 27 into a volt meter whose range is suited to the voltage input to the bridge.

In operation, the meter 27 is switched to read the bridge input and the amplifier 17 is adjusted to balance the drive to the bridge about zero potential. This adjustment is critical in the case of a long period seismograph as a small unbalance current may deflect the galvanometer a long way from its central position. Subsequently to balancing the drive the bridge itself is balanced using the meter 27 as a rough indicator, before switching in the sensitive galvanometer. When the galvanometer is connected into the circuit, it may be strongly deflected by thermal E.M.F. in the circuit or by a leakage from the high voltage lines of the amplifier. This deflection is returned to zero by adjusting the balance circuit 31. This circuit consists of a potentiometer in an auxiliary bridge circuit supplied by a 1.5 volt cell and enables balancing currents of up to one microampere to be sent through the galvanometer in either direction to cancel out the effects of thermal E.M.F.

What I claim as my invention is:

1. A method for calibrating a seismograph having a galvanometer and an electromagnetic seismometer which includes a frame and mass resiliently mounted to said frame, an electromagnetic transducer responsive to relative motion between said mass and said frame, comprising the steps of connecting the transducer as one arm of a Maxwell bridge circuit, connecting the galvanometer as a detector for said bridge circuit, clamping the mass of the seismometer to prevent said relative motion, applying alternating current to the bridge circuit, and balancing the bridge circuit by obtaining a null reading on the galvanometer; unclamping the mass of the seismometer, varying the frequency of the alternating current applied to the bridge circuit and noting the deflections of the galvanometer corresponding to various frequencies of the alternating current.

2. A method as claimed in claim 1 in which the alternating current is applied to the bridge circuit across one of the ratio arms thereof and comprising the additional steps of clamping the mass of the seismometer to prevent said relative motion and noting the deflection of the galvanometer; unclamping the mass of the seismometer, and noting the deflection of the galvanometer.

3. A method of calibrating a seismograph having a galvanometer and an electromagnetic seismometer which includes a frame and a mass resiliently mounted to said frame, an electromagnetic transducer responsive to relative motion between said mass and said frame wherein the deflection of said galvanometer due to current flowing through said electromagnetic transducer is equivalent to a ground acceleration of $\ddot{x}=Ki_c/M$ where $\ddot{x}$ is the equivalent ground acceleration, K is the transducer constant of proportionality, $i_c$ is the current flowing through the seismometer transducer coil and M is the mass of the seismometer, comprising the steps of measuring the current flowing through the coil of the transducer, electrically determining the value of $k$ the constant of proportionality, measuring the mass M and determining the equivalent ground acceleration $\ddot{x}$ by inserting these values into the above equation.

4. A method of calibrating a seismograph as claimed in claim 3 wherein the transducer constant of proportionality, K, is determined by the steps of connecting the transducer as one arm of a Maxwell bridge circuit, connecting the galvanometer as a detector for said bridge circuit, clamping the mass of the seismometer to prevent said relative motion, applying alternating current to the bridge circuit, and balancing the bridge circuit by obtaining a null reading on the galvanometer; measuring the current through the transducer $i_{c1}$, unclamping the mass of the seismometer, and noting the galvanometer deflection $\theta_2$; applying a known alternating current voltage $e_s$ to the bridge circuit across one of the ratio arms thereof, clamping the mass of the seismometer to prevent said relative motion, and noting the deflection $\theta_3$ of the galvanometer; unclamping the mass of the seismometer and noting the resulting galvanometer deflection $\theta_4$; determining the mechanical impedance $Zm$ of the mass of the seismometer; and determining the transducer constant of proportionality $k$ from the equation.

$$e_s\frac{\theta_2}{\theta_4}=K^2\frac{i_{c1}}{Zm}$$

5. A method of calibrating a seismograph as claimed in claim 4, wherein the reaction of the galvanometer on the seismometer, $Zg$, is determined from the equation $$e_s\frac{\theta_2}{\theta_3}=K^2\frac{i_{c1}}{Zm+Zg}$$

6. A method of calibrating a seismograph having a galvanometer and an electromagnetic seismometer which includes a frame and a mass resiliently mounted to said frame, an electromagnetic transducer responsive to relative motion between said mass and said frame, wherein the transducer constant of proportionality $k$ is found by the steps of connecting said transducer as one arm of the Maxwell bridge circuit, connecting the galvanometer as a detector for said bridge circuit, clamping the mass of the seismometer to prevent said relative motion, applying alternating current to the bridge circuit, and balancing the bridge circuit by obtaining a null reading on the galvanometer; unclamping the mass of the seismometer applying a square wave current i.e. to the bridge circuit, noting the deflections of the galvanometer produced when said current starts or stops; applying and removing a test mass and noting the deflection of the galvanometer when said test mass is applied or removed, comparing the deflection of the galvanometer produced by the application of said square wave with the deflection of the galvanometer produced by the application and removal of said test mass thereby deducing the transducer constant of proportionality K from the relation that the force exerted by the square wave current is the product of the transducer constant of proportionality multiplied by said square wave current.

References Cited in the file of this patent

UNITED STATES PATENTS

| | | |
|---|---|---|
| 1,176,559 | Hoxie | Mar. 21, 1916 |
| 2,046,704 | Slonczewski | July 7, 1936 |
| 2,602,833 | Swift | July 8, 1952 |
| 2,648,979 | Cornett | Aug. 18, 1953 |
| 2,695,395 | Montgomery | Nov. 23, 1954 |
| 2,733,406 | Overby | Jan. 31, 1956 |

OTHER REFERENCES

Electronic Industries, May 1946, pp. 72, 73, 118, 120–122.